(12) United States Patent
Zhang et al.

(10) Patent No.: US 11,800,542 B2
(45) Date of Patent: Oct. 24, 2023

(54) DATA TRANSMISSION METHOD, APPARATUS, DEVICE AND SYSTEM

(71) Applicant: Qingdao Pico Technology Co., Ltd., Qingdao (CN)

(72) Inventors: Xiuzhi Zhang, Beijing (CN); Feifei Ding, Beijing (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 18/151,248

(22) Filed: Jan. 6, 2023

(65) Prior Publication Data
US 2023/0156747 A1 May 18, 2023

Related U.S. Application Data

(63) Continuation of application No. PCT/CN2022/104824, filed on Jul. 11, 2022.

(30) Foreign Application Priority Data

Aug. 10, 2021 (CN) .......................... 202110914197.X

(51) Int. Cl.
*H04W 72/30* (2023.01)
*H04W 72/54* (2023.01)
*H04W 36/08* (2009.01)
*H04W 48/20* (2009.01)

(52) U.S. Cl.
CPC .......... *H04W 72/30* (2023.01); *H04W 36/08* (2013.01); *H04W 48/20* (2013.01); *H04W 72/54* (2023.01)

(58) Field of Classification Search
CPC ..... H04W 72/30; H04W 72/54; H04W 36/08; H04W 48/20; H04W 4/06; H04W 56/001; H04W 76/11; H04W 76/14; H04W 12/50; H04W 4/80; H04W 8/005; G02B 27/017
See application file for complete search history.

(56) References Cited

U.S. PATENT DOCUMENTS

2016/0128118 A1  5/2016  Duffell et al.

FOREIGN PATENT DOCUMENTS

| CN | 106768361 A |   | 5/2017 |             |
|----|-------------|---|--------|-------------|
| CN | 109613983 A | * | 4/2019 | G02B 27/0093 |
| CN | 109613983 A |   | 4/2019 |             |

(Continued)

OTHER PUBLICATIONS

CN109613983A—Google Patent Translated (Year: 2023).*

(Continued)

*Primary Examiner* — Chi H Pham
*Assistant Examiner* — Ji-Hae Yea
(74) *Attorney, Agent, or Firm* — ARENTFOX SCHIFF LLP

(57) ABSTRACT

Embodiments of the present disclosure disclose a data transmission method, apparatus, device, and system. The method includes: receiving a broadcast signal from a head-mounted display device, the broadcast signal including at least time synchronization information and/or control data, and the broadcast signal being transmitted in accordance with a predetermined period; and transmitting, in a wireless transmission channel that is obtained in advance, handle data to the head-mounted display device in accordance with a predetermined time interval.

7 Claims, 4 Drawing Sheets

Receiving a broadcast signal from a head-mounted display device, the broadcast signal including at least time synchronization information and/or control data, and the broadcast signal being transmitted in accordance with a predetermined period  ⟶ 1100

Transmitting, in a wireless transmission channel that is obtained in advance, handle data to the head-mounted display device in accordance with a predetermined time interval  ⟶ 1200

(56) References Cited

FOREIGN PATENT DOCUMENTS

| | | | | |
|---|---|---|---|---|
| CN | 109633632 | A | 4/2019 | |
| CN | 111162859 | A | 5/2020 | |
| CN | 111897394 | A * | 11/2020 | ............... G06F 1/12 |
| CN | 111897394 | A | 11/2020 | |
| CN | 113747370 | A | 12/2021 | |
| EP | 3013080 | A1 * | 4/2016 | ............... H04W 4/80 |

OTHER PUBLICATIONS

CN111897394A—Google Patent Translated (Year: 2023).*
Google Translations of portions of CN109613983A and CN111897394A (Year: 2023).*
International Search Report for International Patent Application No. PCT/CN2022/104824, dated Sep. 26, 2022 (4 pages).
First Office Action for Chinese Patent Application No. 202110914197.X, dated May 9, 2022 (18 pages).
Second Office Action for Chinese Patent Application No. 202110914197.X, dated Nov. 8, 2022 (12 pages).

* cited by examiner

DATA TRANSMISSION METHOD, APPARATUS, DEVICE AND SYSTEM

CROSS REFERENCE TO RELATED APPLICATIONS

This application is a continuation application of International Application No. PCT/CN2022/104824 filed on Jul. 11, 2022, which claims priority to Chinese Patent Application No. 202110914197.X, filed with China National Intellectual Property Administration on Aug. 10, 2021, entitled "DATA TRANSMISSION METHOD, APPARATUS, DEVICE AND SYSTEM", the entire content of which is incorporated herein by reference.

TECHNICAL FIELD

The present disclosure relates to the technical field of data processing, and more particularly relates to a data transmission method, apparatus, device, and system.

BACKGROUND

Data transmission between a virtual reality (VR) head-mounted display device and a handle is implemented on the basis of a wireless communication protocol such as Bluetooth, BLE, ZigBee, and WIFI.

In VR simultaneous localization and mapping (SLAM) tracking, a wireless communication system is required to be capable of implementing the transmission of sensor data of an inertial measurement unit (IMU) of a handle controller as well as joystick data, trigger data, press key data, touch key data and battery powder data of an input unit of the handle controller. The wireless communication system is also required to be capable of implementing synchronous data transmission between the head-mounted display device and the handle; firstly, timestamp data of the IMU sensor in the handle for the SLAM applications; and secondly, a light emitting diode of the handle being lighted in an exposure time of a camera in an optical tracking system, to achieve the optical tracking. Meanwhile, the wireless communication system is also required to transmit data of a command from the head-mounted display device, such as a motor vibration command and a light emitting diode control command, to the handle to be executed.

A VR spatial location system requires high data transmission rate and delay, and particularly, for the handle moving at high speed, the data transmission rate thereof is a critical factor affecting the performance of the handle. However, the existing wireless communication schemes cannot satisfy the requirement of the VR spatial location system on a wireless communication system. Therefore, there is a need to provide a new data transmission scheme.

SUMMARY

One objective of embodiments of the present disclosure is to provide a new technical solution for data transmission.

According to a first aspect of the present disclosure, a data transmission method is provided. The method includes:

receiving a broadcast signal from a head-mounted display device, the broadcast signal including at least time synchronization information and/or control data, and the broadcast signal being transmitted in accordance with a predetermined period; and transmitting, in a wireless transmission channel that is obtained in advance, handle data to the head-mounted display device in accordance with a predetermined time interval.

Optionally, before the broadcast signal is received, the method further includes:

transmitting a pairing request to the head-mounted display device at a predetermined frequency point, the pairing request including at least a first device address and a device identity;

receiving a pairing response from the head-mounted display device, the pairing response including at least a second device address and the wireless transmission channel; and binding the first device address and the second device address, and transmitting a pairing success message to the head-mounted display device.

Optionally, the method further includes:

calculating current transmitting time of the handle data based on previous transmitting time of the handle data, a data updating frequency, and the wireless transmission channel in response to not receiving the broadcast signal; and transmitting the handle data to the head-mounted display device at the current transmitting time of the handle data.

Optionally, the broadcast signal further includes a wireless transmission channel list, the wireless transmission channel list being reselected and transmitted by the head-mounted display device after interference information in an environment is detected.

According to a second aspect of the present disclosure, a data transmission method is further provided. The method includes:

transmitting a broadcast signal in a predetermined period, the broadcast signal including at least time synchronization information and/or control data; and receiving handle data from a handle.

Optionally, before the broadcast signal is transmitted in the predetermined period, the method further includes:

receiving a pairing request from the handle, the pairing request including at least a first device address and a device identity;

transmitting a pairing response to the handle, the pairing response including at least a second device address and a wireless transmission channel; and receiving a pairing success message.

Optionally, the method further includes:

scanning an environment in real time for one or more wireless transmission channels to select a wireless transmission channel list based on interference information of the one or more wireless transmission channels; and transmitting the broadcast signal carrying the wireless transmission channel list to the handle.

Optionally, the method further includes:

switching to any wireless transmission channel in the wireless transmission channel list.

According to a third aspect of the present disclosure, further provided is a data transmission apparatus, including:

a receiving module configured to receive a broadcast signal from a head-mounted display device, the broadcast signal including at least time synchronization information and/or control data, and the broadcast signal being transmitted in accordance with a predetermined period; and a transmitting module configured to transmit, in a wireless transmission channel that is obtained in advance, handle data to the head-mounted display device in accordance with a predetermined time interval.

According to a fourth aspect of the present disclosure, further provided is a data transmission apparatus, including:

a transmitting module configured to transmit a broadcast signal in a predetermined period, the broadcast signal including at least time synchronization information and/or control data; and a receiving module configured to receive handle data from a handle.

According to a fifth aspect of the present disclosure, further provided is a handle device, including a processor, a memory, and a program or instructions storing in the memory and executable in the processor, the program or the instructions, when being executed by the processor, implementing the steps of the data transmission method according to any one in the first aspect of the present disclosure.

According to a sixth aspect of the present disclosure, further provided is a head-mounted display device, including a processor, a memory, and a program or instructions storing in the memory and executable in the processor, the program or the instructions, when being executed by the processor, implementing the steps of the data transmission method according to any one in the second aspect of the present disclosure.

According to a seventh aspect of the present disclosure, provided is a readable storage medium storing a program or instructions, the program or the instructions, when being executed by a processor, implementing the steps of the method according to the first aspect.

According to an eighth aspect of the present disclosure, provided is a readable storage medium storing a program or instructions, the program or the instructions, when being executed by a processor, implementing the steps of the method according to the second aspect.

According to a ninth aspect of the present disclosure, provided is a data transmission system, including:

a head-mounted display device being the head-mounted display device according to the eighth aspect of the present disclosure and including a first wireless communication module; and a handle being the handle according to the seventh aspect of the present disclosure and including a second wireless communication module;

the head-mounted display device and the handle being connected for wireless communication via the first wireless communication module and the second wireless communication module.

According to the embodiments of the present disclosure, the handle receives the broadcast signal from the head-mounted display device, the broadcast signal includes at least the time synchronization information and/or the control data, the broadcast signal is transmitted in accordance with the predetermined period; the handle data is transmitted, in the wireless transmission channel that is obtained in advance, to the head-mounted display device in accordance with the predetermined time interval; and thus, the functions of pairing, connection and data transmission between the handle and the head-mounted display device are achieved, and the requirement of a VR spatial location system on the performance of wireless communication can be satisfied.

BRIEF DESCRIPTION OF THE DRAWINGS

The accompanying drawings incorporated into the description to constitute a part thereof show embodiments of the present disclosure, and they serve to explain the principle of the present disclosure in conjunction with the descriptions therefor.

DETAILED DESCRIPTION

Now, various exemplary embodiments of the present disclosure will be described in detail with reference to the accompanying drawings. It should be noted that relative layout, digital expressions and numerical values of components and steps described in these embodiments are not limited within the scope of the present disclosure unless otherwise defined specifically.

The following description for at least one exemplary embodiment is only illustrative in fact, but is not used as any limitation on the present disclosure as well as the application and usage thereof.

The technologies, methods and devices known by the ordinary skill in the art may not be discussed in detail, however, in a proper case, the technologies, methods and devices should be regarded as a part of the description.

In all the shown and discussed examples, any concrete values should be explained to be exemplary only, but are not used as limitations. Therefore, other examples of the exemplary embodiments may have different values.

It should be noted that similar numerals and letters represent similar items in the following accompanying drawings, and therefore, once a certain item is defined in one of the accompanying drawings, it is unnecessary to further discuss the item in the subsequent accompanying drawings.

First Embodiment

<Method>

Figure 1:
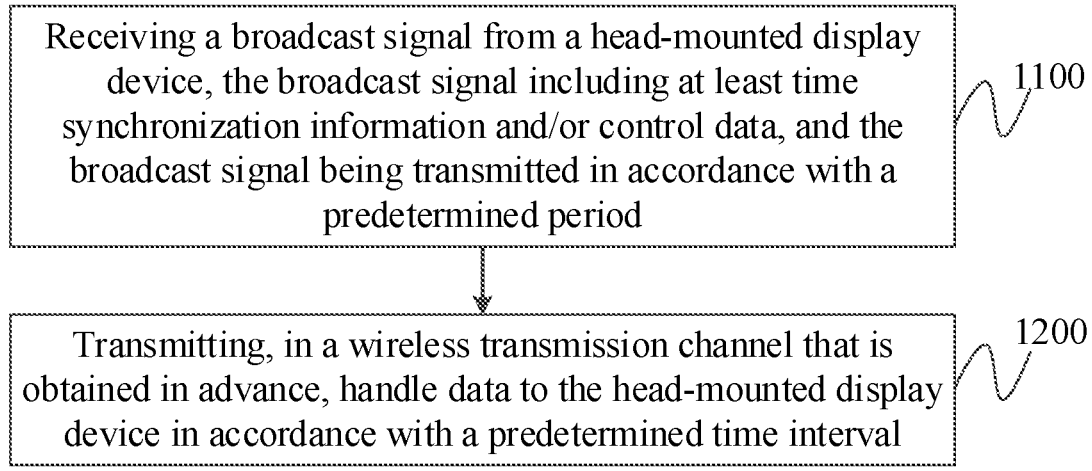
FIG. 1 is a schematic flowchart illustrating a data transmission method according to a first embodiment of the present disclosure.

FIG. 1 is a schematic flowchart illustrating a data transmission method according to a first embodiment of the present disclosure. The data transmission method in the present embodiment may, for example, be performed by a handle which may be a left handle or a right handle.

Figure 2:
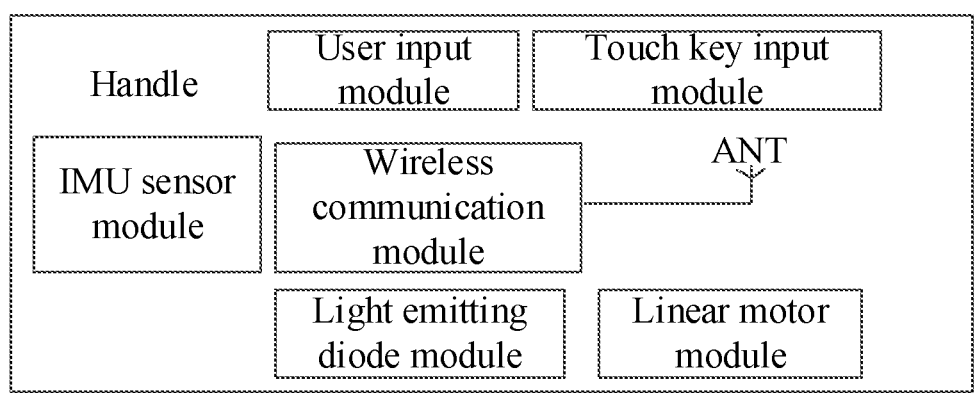
FIG. 2 is a schematic diagram showing a hardware structure of a handle according to the first embodiment of the present disclosure.

As shown in FIG. 2, the handle may include an IMU sensor module, a user input module, a touch key input module, a wireless communication module, a light emitting diode module, a linear motor module, and an antenna. Sensor data, user input data, touch data, etc.

obtained by the handle are all transmitted to a head-mounted display device by the wireless communication module, and a broadcast signal from the head-mounted display device may be received by the wireless communication module. It should be noted that, in the present embodiment, the wireless communication module adopts a 2.4G data communication protocol.

Specifically, as shown in FIG. 1, the data transmission method in the present embodiment may include the following steps 1100 to 1200.

At step 1100, a broadcast signal from a head-mounted display device is received, the broadcast signal includes at least time synchronization information and/or control data, and the broadcast signal is transmitted in accordance with a predetermined period.

The time synchronization information is used for enabling the handle to adjust a time of the handle, to make the time of the handle be the same as a time of the head-mounted display device. The control data is, for example, used to control a light emitting diode of the handle to be lighted and control a motor to vibrate, etc., to make the handle perform corresponding control operation in accordance with the control data.

Optionally, in an actual application, the broadcast signal may further include other data interaction information, for example, the broadcast signal may further include a wireless transmission channel list so that a plurality of wireless transmission channels for data transmission are configured to the handle. There are no specific limitations herein.

At step 1200, handle data is transmitted, in a wireless transmission channel that is obtained in advance, to the head-mounted display device in accordance with a predetermined time interval.

Specifically, the wireless transmission channel indicates a data communication channel where there is little interference information, and is issued by the head-mounted display device, so that the handle transmits the handle data in the communication channel where there is little interference information. The handle data transmitted by the handle to the head-mounted display device in the wireless transmission channels is, for example, IMU sensor data, user input data, and user touch data.

In the present embodiment, a process that the wireless transmission channel is obtained includes, for example, the following steps 2100 to 2300.

At step 2100, a pairing request is transmitted to the head-mounted display device at a predetermined frequency point, and the pairing request includes at least a first device address and a device identity.

The predetermined frequency point is selected by the handle, and the pairing request is transmitted to the head-mounted display device at the predetermined frequency point so that pairing with the head-mounted display device is completed. Specifically, the pairing request includes at least the first device address of the handle and the device identity of the handle. The device identity of the handle is used for uniquely identifying the handle, and the first device address is a communication address of the handle, such as an MAC address.

At step 2200, a pairing response from the head-mounted display device is received, and the pairing response includes at least a second device address and the wireless transmission channel.

Specifically, the second device address is a communication address of the head-mounted display device, and the wireless transmission channel indicates a data communication channel used for data transmission. Optionally, the number of wireless transmission channels in the pairing response may, for example, be five.

At step 2300, the first device address and the second device address are bound, and a pairing success message is transmitted to the head-mounted display device.

After the handle binds the first device address and the second device address, a wireless receiver and a wireless transmitter of the handle may receive respective corresponding information, and thus, corresponding connections between wireless devices are implemented.

Further, in view of the fact that the handle may not receive the broadcast signal from the head-mounted display device due to influences from interference information in an environment, in the present embodiment, the method further includes the following operations.

The handle determines, in real time, whether the broadcast signal is received; if yes, current transmitting time of the handle data is calculated; and if not, the current transmitting time of the handle data is calculated based on previous transmitting time of the handle data, a data updating frequency, and the wireless transmission channel. The handle data is transmitted to the head-mounted display device at the current transmitting time of the handle data. In this way, the situation of packet loss of the handle data caused by the packet loss of the broadcast signal can be reduced.

Figure 3:
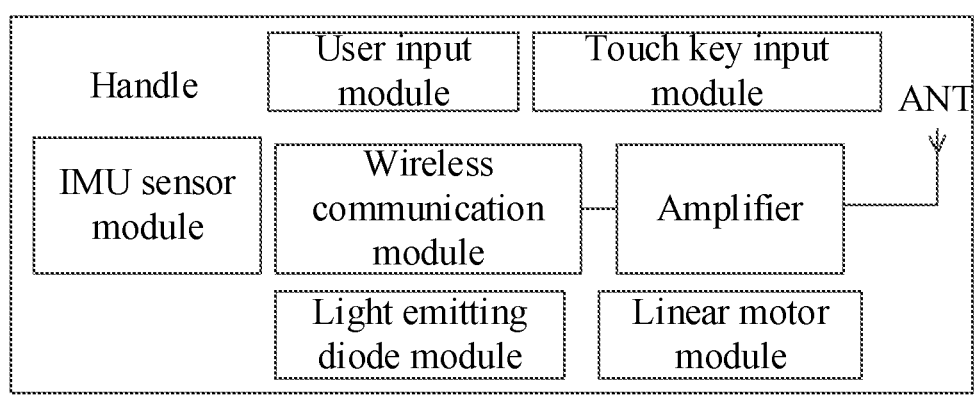
FIG. 3 is a schematic diagram showing a hardware structure of another handle according to the first embodiment of the present disclosure.

In an example, as shown in FIG. 3, an amplifier may also be added in the handle, the amplifier is configured to amplify a transmitting power when the handle transmits the handle data, and thus, the situation of packet loss of the handle data caused by environmental interference is further reduced in term of hardware.

In an example, the broadcast signal may further include a wireless transmission channel list; and the wireless transmission channel list is reselected and transmitted by the head-mounted display device after interference information in an environment is detected. Therefore, after the handle receives the wireless transmission channel list, the handle transmits the handle data via any wireless transmission channel in the wireless transmission channel list.

<Apparatus>

Figure 4:
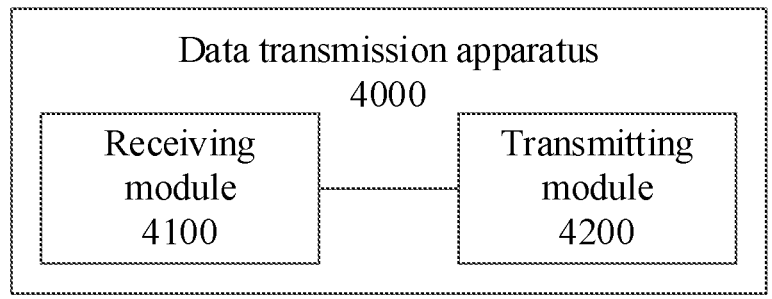
FIG. 4 is a schematic diagram showing a structure of a data transmission apparatus according to the first embodiment of the present disclosure.

FIG. 4 is a schematic diagram showing a structure of a data transmission apparatus according to the first embodiment of the present disclosure.

As shown in FIG. 4, the data transmission apparatus 4000 in the present embodiment may, for example, include a receiving module 4100 and a transmitting module 4200.

The receiving module 4100 is configured to receive a broadcast signal from a head-mounted display device, the broadcast signal including at least time synchronization information and/or control data, and the broadcast signal being transmitted in accordance with a predetermined period.

The transmitting module 4200 is configured to transmit, in a wireless transmission channel that is obtained in advance, handle data to the head-mounted display device in accordance with a predetermined time interval.

In an embodiment, the transmitting module 4200 may be further configured to transmit a pairing request to the head-mounted display device at a predetermined frequency point, and the pairing request includes at least a first device address and a device identity.

Accordingly, the receiving module 4100 may be further configured to receive a pairing response from the head-mounted display device, and the pairing response includes at least a second device address and the wireless transmission channel. The transmitting module 4200 may be further configured to bind the first device address and the second device address, and transmit a pairing success message to the head-mounted display device.

In an embodiment, the data transmission apparatus 4000 may further include a calculation module configured to calculate current transmitting time of the handle data based on previous transmitting time of the handle data, a data updating frequency and the wireless transmission channel in response to not receiving the broadcast signal; and the transmitting module 4200 may be further configured to transmit the handle data to the head-mounted display device at the current transmitting time of the handle data.

In an embodiment, the broadcast signal further includes a wireless transmission channel list; and the wireless transmission channel list is reselected and transmitted by the head-mounted display device after interference information in an environment is detected.

<Handle>

Figure 5:
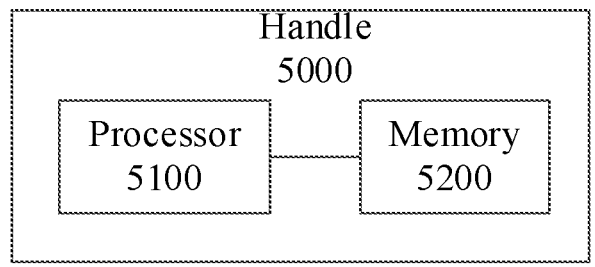
FIG. 5 is a schematic diagram showing a structure of the handle according to the first embodiment of the present disclosure.

As shown in FIG. 5, an embodiment of the present disclosure further provides a handle 5000 including a processor 5100, a memory 5200, and a program or instructions storing in the memory 5200 and executable in the processor 5100, and the program or the instructions, when being executed by the processor 5100, implement the steps of the data transmission method according to the first embodiment as mentioned above.

<Readable Storage Medium>

An embodiment of the present disclosure further provides a readable storage medium storing a program or instructions, and the program or the instructions, when being executed by a processor, implement the method according to the embodiment as mentioned above and may achieve the same technical effect, and the descriptions thereof are omitted herein in order to avoid repetition.

The processor is a processor in the electronic device in the above-mentioned embodiment. The readable storage medium includes a computer-readable storage medium such as a computer read-only memory (ROM), a random access memory (RAM), a diskette or an optical disk.

The data transmission method and apparatus, the handle and the readable storage medium provided in the present embodiment have been described as above in conjunction with the accompanying drawings. In the present embodiment, the handle receives the broadcast signal from the head-mounted display device, the broadcast signal includes at least the time synchronization information and/or the control data, and the broadcast signal is transmitted in accordance with the predetermined period; the handle data is transmitted, in the wireless transmission channel that is obtained in advance, to the head-mounted display device in accordance with the predetermined time interval; and thus, the functions of pairing, connection and data transmission between the handle and the head-mounted display device are implemented, and the requirement of a VR spatial location system on the performance of wireless communication can be satisfied.

Second Embodiment

<Method>

Figure 6:
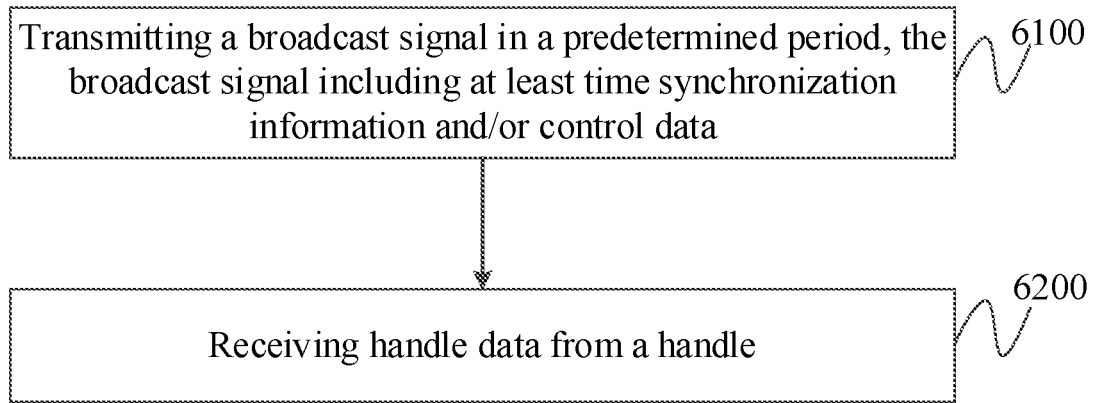
FIG. 6 is a schematic flowchart illustrating a data transmission method according to a second embodiment of the present disclosure.

FIG. 6 is a schematic flowchart illustrating a data transmission method according to a second embodiment of the present disclosure. The data transmission method in the present embodiment may, for example, be performed by a head-mounted display device which may, for example, be a VR helmet and VR glasses.

Specifically, as shown in FIG. 6, the data transmission method in the present embodiment may include the following steps 6100 and 6200.

At step 6100, a broadcast signal is transmitted in a predetermined period, and the broadcast signal includes at least time synchronization information and/or control data.

The time synchronization information is used for enabling the handle to adjust a time of the handle, to make the time of the handle be the same as a time of the head-mounted display device. The control data is, for example, used to control a light emitting diode of the handle to be lighted and control a motor to vibrate, etc., to make the handle perform corresponding control operation in accordance with the control data.

For example, when an optical tracking function is implemented, the head-mounted display device may transmit lighting control data to the handle via the broadcast signal, to make the handle lights the light emitting diode in accordance with the lighting control data. In this way, the head-mounted display device can track the light emitting diode of the handle by a camera, to achieve the optical tracking.

Optionally, in an actual application, the broadcast signal may further include other data interaction information, for example, the broadcast signal may further include a wireless transmission channel list so that a plurality of wireless transmission channels for data transmission are configured to the handle. There are no specific limitations herein.

Step 6200, handle data from a handle is received.

The handle data is, for example, IMU sensor data, user input data, and user touch data, which is not specifically limited in the present embodiment.

It should be noted that the handle data received by the head-mounted display device may be from a plurality of handles which transmit, in the wireless transmission channels that are obtained in advance, their own handle data to the head-mounted display device in accordance with the respective predetermined time intervals.

In an embodiment, before the head-mounted display device transmits the broadcast signal in the predetermined period, the method may further include the following steps 7100 to 7300.

At step 7100, a pairing request from the handle is received, and the pairing request includes at least a first device address and a device identity.

Specifically, the pairing request includes at least the first device address of the handle and the device identity of the handle. The device identity of the handle is used for uniquely identifying the handle, and the first device address is a communication address of the handle, such as an MAC address.

At step 7200, a pairing response is transmitted to the handle, and the pairing response includes at least a second device address and a wireless transmission channel.

The head-mounted display device may transmit the pairing response to the handle based on the first device address. The second device address is a communication address of the head-mounted display device, and the wireless transmission channel indicates a data communication channel used for data transmission. Optionally, the number of wireless transmission channels in the pairing response may, for example, be five.

At step 7300, a pairing success message is received.

Specifically, the pairing success message is transmitted to the head-mounted display device after the handle completes the operation of binding the first device address and the second device address and is used for informing the head-mounted display device of a completed corresponding connection between wireless devices.

Figure 7:
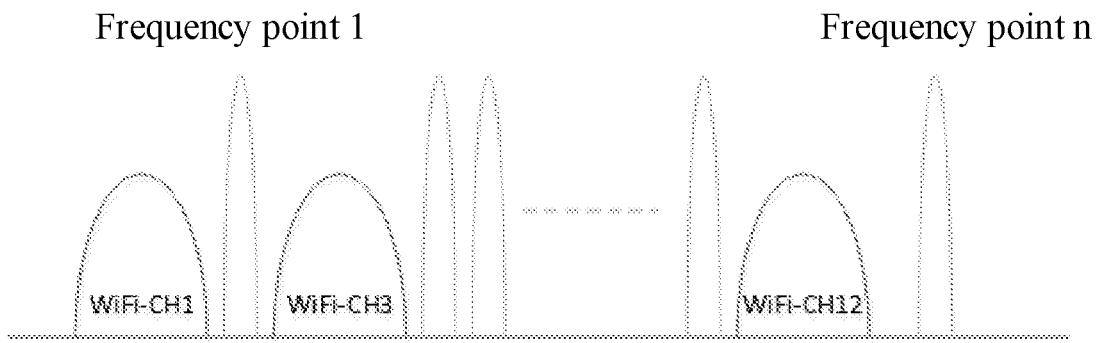
FIG. 7 is a schematic diagram showing a scanning signal of a head-mounted display device according to the second embodiment of the present disclosure.

Further, in view of the fact that the communication between the head-mounted display device and the handle may be affected by interference information in an environment, in the present embodiment, as shown in FIG. 7, the head-mounted display device may further scan an ambient environment in real time for one or more wireless transmission channels to select a wireless transmission channel list based on interference information of the wireless transmission channel; and transmit the broadcast signal carrying the wireless transmission channel list to the handle. For example, the head-mounted display device may select a frequency point where there is little interference information in the ambient environment as the wireless data communication channel.

Since an ambient signal changes in real time, in the present embodiment, a scanning time interval is predetermined, and the head-mounted display device is enabled to rescan the ambient signal within the scanning time interval, so that there is higher anti-interference capability during data transmission.

Specifically, after completing the scanning of the ambient signal, the head-mounted display device transmits the broadcast signal in the predetermined period, and a new wireless transmission channel is carried in the broadcast signal. After receiving the broadcast signal, the handle updates, based on the new wireless transmission channel, the wireless transmission channel stored by the handle, and transmits a frequency point updating completion response to the head-mounted display device after completing the updation. After receiving the frequency point updating completion response, the head-mounted display device is switched to any wireless transmission channel in the wireless transmission channel list.

<Apparatus>

Figure 8:
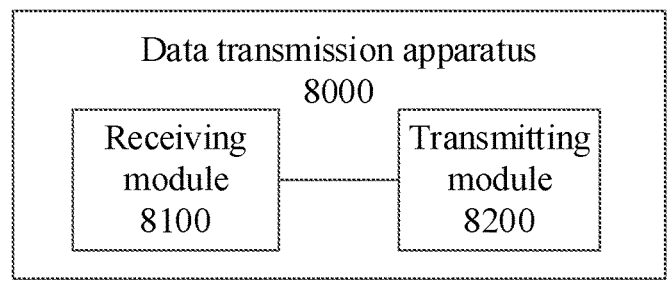
FIG. 8 is a schematic diagram showing a structure of a data transmission apparatus according to the second embodiment of the present disclosure.

FIG. 8 is a schematic diagram showing a structure of a data transmission apparatus according to the second embodiment of the present disclosure.

As shown in FIG. 8, the data transmission apparatus 8000 in the present embodiment may include a transmitting module 8100 and a receiving module 8200.

The transmitting module 8100 is configured to transmit a broadcast signal in a predetermined period, and the broadcast signal includes at least time synchronization information and/or control data.

The receiving module 8200 is configured to receive handle data from a handle.

In an embodiment, the receiving module 8200 may be further configured to receive a pairing request from the handle, and the pairing request includes at least a first device address and a device identity. Accordingly, the transmitting module 8100 may be further configured to transmit a pairing response to the handle, and the pairing response includes at least a second device address and a wireless transmission channel. The receiving module 8200 may be further configured to receive a pairing success message.

In an embodiment, the data transmission apparatus 8000 may further include an updating module configured to scan an environment in real time for one or more wireless transmission channels to select a wireless transmission channel list based on interference information of the wireless transmission channel; and the transmitting module 8100 is further configured to transmit the broadcast signal carrying the wireless transmission channel list to the handle.

In an embodiment, the data transmission apparatus 8000 may further include a switching module configured to switch to any wireless transmission channel in the wireless transmission channel list.

<Head-Mounted Display Device>

Figure 9:
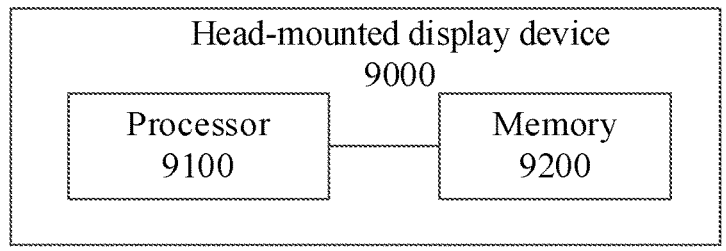
FIG. 9 is a schematic diagram showing a structure of a head-mounted display device according to the second embodiment of the present disclosure.

As shown in FIG. 9, an embodiment of the present disclosure further provides a head-mounted display device 9000 including a processor 9100, a memory 9200, and a program or instructions storing in the memory 9200 and executable in the processor 9100, and the program or the instructions, when being executed by the processor 9100, implements the steps of the data transmission method according to the second embodiment as mentioned above.

<Readable Storage Medium>

An embodiment of the present disclosure further provides a readable storage medium storing a program or instructions, and the program or the instructions, when being executed by a processor, implements the method according to the second embodiment as mentioned above and may achieve the same technical effects, and the descriptions thereof are omitted herein in order to avoid repetition.

The processor is a processor in the electronic device in the above-mentioned embodiment. The readable storage medium includes a computer-readable storage medium such as a computer read-only memory (ROM), a random access memory (RAM), a diskette or an optical disk.

The data transmission method and apparatus, the head-mounted display device and the readable storage medium provided in the present embodiment have been described in detail as above in conjunction with the accompanying drawings. The head-mounted display device transmits the broadcast signal in the predetermined period, the broadcast signal includes at least the time synchronization information and/or the control data, and the broadcast signal is transmitted in accordance with the predetermined period; and the handle data from the handle is received; and thus, the functions of pairing, connection and data transmission between the handle and the head-mounted display device are implemented, and the requirement of a VR spatial location system on the performance of wireless communication can be satisfied.

<System>

Figure 10:
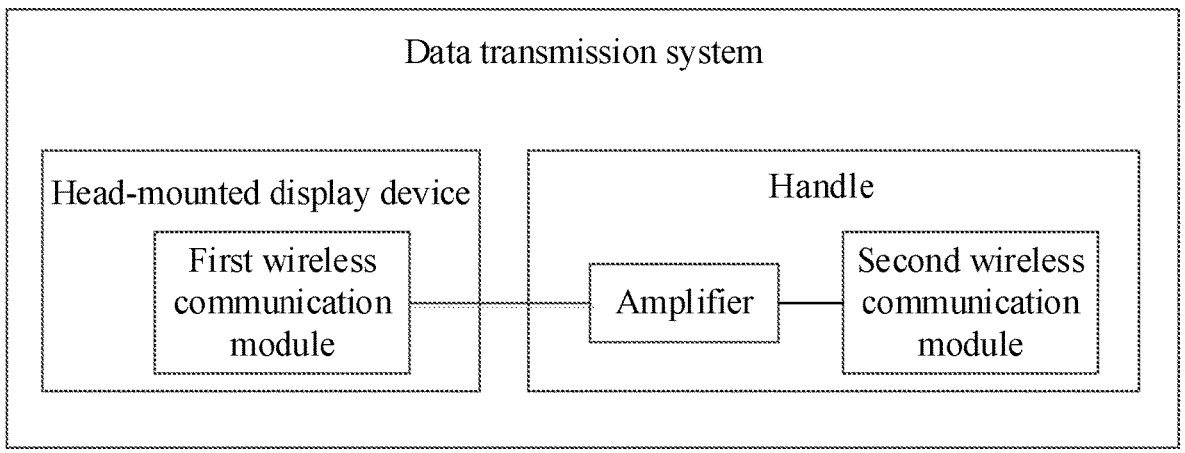
FIG. 10 is a schematic diagram showing a structure of a data transmission system according to an embodiment of the present disclosure.

FIG. 10 is a schematic diagram showing a structure of a data transmission system according to an embodiment of the present disclosure.

As shown in FIG. 10, the data transmission system in the present embodiment may include:

a head-mounted display device being the head-mounted display device in the above-mentioned second embodiment and including a first wireless communication module; and a handle being the handle in the above-mentioned first embodiment and including a second wireless communication module and an amplifier.

The head-mounted display device and the handle are connected for wireless communication via the first wireless communication module and the second wireless communication module, and the amplifier is configured to amplify the strength of a wireless communication signal of the handle.

It should be noted that, in the present embodiment, the first wireless communication module and the second wireless communication module implement wireless communication based on a 2.4G data communication protocol. The 2.4G data communication protocol refers to data transmission between physical layers of a wireless transmitter and a wireless receiver, no data retransmission is performed in the entire data transmission process, the transmission speed of electromagnetic waves is far larger than the distance between the wireless transmitter and the wireless receiver, and therefore, in the present embodiment, the delay of the data transmission time is a constant value.

Figure 11:
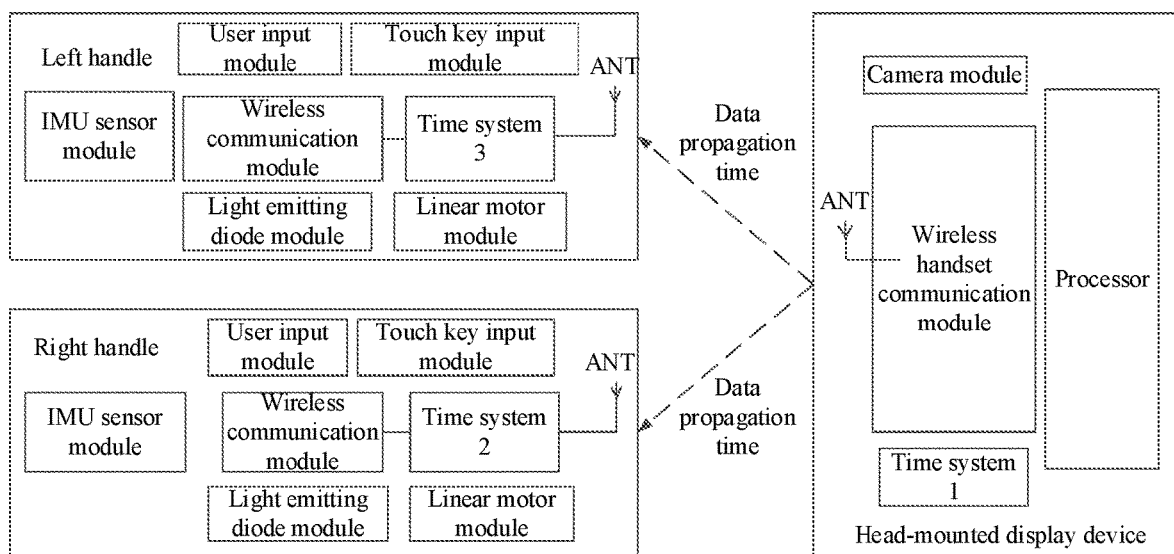
FIG. 11 is a schematic diagram showing time synchronization of a data transmission system according to an embodiment of the present disclosure.

As shown in FIG. 11, based on the constant delay value of the data transmission time, in the present embodiment, the times of a left handle time system and a right handle time system and the time of a time system of a wireless communication module of the head-mounted display device may be synchronized. In this way, the IMU sensor data of the handle may have unified timestamp information; and by means of the time systems, a light emitting diode of the handle may also be precisely controlled to correspond to an exposure time point of a camera module.

By using the data transmission system in the present embodiment, the functions of pairing, connection and data transmission between the handle and the head-mounted display device are implemented, and the requirement of a VR spatial location system on the performance of wireless communication can be satisfied. Meanwhile, due to the arrangement of the amplifier, the strength of a wireless communication signal transmitted by the handle can be guaranteed, and thus, the anti-interference capability is further improved.

The present disclosure may be a system, a method and/or a computer program product. The computer program product may include a computer-readable storage medium storing a computer-readable program instructions used for enabling a processor to implement various aspects of the present disclosure.

The computer-readable storage medium may be a tangible device capable of holding and storing instructions used by an instruction execution device. The computer-readable storage medium may, for example, include, but is not limited to an electric storage device, a magnetic storage device, an optical storage device, and electromagnetic storage device, a semiconductor storage device, or any appropriate combinations thereof. A more specific example (a non-exhaustive list) of the computer-readable storage medium includes a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital video disk (DVD), a memory stick, a floppy disk, a mechanical encoding device such as a punched card or a protruding structure in a groove storing instructions, and any appropriate combinations thereof. The computer-readable storage medium used herein is not explained as an instantaneous signal itself such as radio waves or other freely propagated electromagnetic waves, electromagnetic waves propagated by waveguides or other transmission media (such as optical pulse in an optical fiber cable), or an electric signal transmitted by a wire.

The computer-readable program instructions described herein may be downloaded from the computer-readable storage medium to each computing/processing device, or downloaded to an external computer or an external storage device via a network such as the Internet, a local area network, a wide-area network and/or a wireless network. The network may include a copper transmission cable, optical fiber transmission, wireless transmission, a router, a firewall, a switch, a gateway computer and/or an edge server. The computer-readable program instructions are received from the network and transmitted by a network adapter card or a network interface in each computing/processing device so as to be stored in the computer-readable storage medium in each computing/processing device.

The computer program instruction operated for executing the present disclosure may be an assembly instruction, an instruction set architecture (ISA) instruction, a machine instruction, a machine-relevant instruction, a microcode, a firmware instruction, state setting data, or a source code or target code compiled by one or any combination of various programming languages, and the programming languages include object-oriented programming languages, such as Smalltalk and C++, and conventional procedural programming languages, such as "C" languages or similar programming languages. The computer-readable program instruction may be completely executed on a user computer, partially executed on the user computer, executed as an independent software package, partially executed on the user computer and partially executed on a remote computer, or completely executed on the remote computer or a server. In a case that the remote computer is involved, the remote computer may be connected to the user computer via any kind of network including a local area network (LAN) or a wide area network (WAN), or may be connected to an external computer (for example, connected by an Internet service provider by means of the Internet). In some embodiments, an electronic circuit such as a programmable logic circuit, a field-programmable gate array (FPGA) or a programmable logic array (PLA) may be customized individually by utilizing state information of the computer-readable program instructions, and the electronic circuit may execute the computer-readable program instructions, thereby implementing various aspects of the present disclosure.

Various aspects of the present disclosure are described with reference to flowcharts and/or block diagrams of a method, apparatus (system) and computer program product according to the embodiments of the present disclosure. It should be understood that each block in the flowcharts and/or block diagrams as well as a combination of all the blocks in the flowcharts and/or block diagrams may be implemented by computer-readable program instructions.

These computer-readable program instructions may be provided to a general-purpose computer, a special-purpose computer, or processors of other programmable data processing apparatuses to generate a machine, so that an apparatus for implementing specified functions/actions in one or more blocks of the process programs and/or the block diagrams is generated when the instructions are executed by the computer or the processors of other programmable data processing apparatuses. These computer-readable program instructions may also be stored in a computer-readable storage medium; and by using these instructions, the computer, the programmable data processing apparatuses and/or other devices work in a specified way, so that a computer-readable medium storing instructions includes a product including the instructions for implementing various aspects of the specified functions/actions in one or more blocks of the process programs and/or the block diagrams.

These computer-readable program instructions may also be loaded in the computer or other programmable data processing apparatuses, or other devices, so that a series of operation steps are performed on the computer or other programmable data processing apparatuses, or other devices to generate a process realized by the computer, and furthermore, the instructions executed on the computer or other programmable data processing apparatuses, or other devices implement the specified functions/actions in one or more blocks of the flowcharts and/or the block diagrams.

The flowcharts and the block diagrams in the accompanying drawings show possibly-implemented system architectures, functions and operations of the system, method and computer program product according to a plurality of embodiments of the present disclosure. In this regard, each block in the flowcharts or the block diagrams may represent a part of a module, a program segment or instructions, and a part of the module, the program segment or the instructions includes one or more executable instructions for implementing specified logic functions. In some alternative implementations, functions marked in the blocks may occur in an order different from an order marked in the accompanying drawings. For example, in fact, two continuous blocks may be performed approximately concurrently, and sometimes, they may also be performed in an inverse order, which is decided according to the involved functions. It should be further noted that each block in the block diagrams and/or the flowcharts and combinations of the blocks in the block diagrams and/or the flowcharts may be implemented by a dedicated hardware-based system executing the specified functions or actions, or may be implemented by a combination of a dedicated hardware and the computer instructions. It is known by the skilled in the art that an implementation in a hardware way, an implementation in a software way and an implementation in a software and hardware combination way are equivalent.

All the embodiments of the present disclosure have been described as above, the foregoing description is illustrative, not exhaustive, and not limited to all the disclosed embodiments. Many modifications and variations will be apparent to those of ordinary skill in the art without departing from the scope and spirit of all the embodiments described. The selection for the terms used herein are selected aims at better explaining the principles of all the embodiments, actual application or technical improvement on the market or making other ordinary skill in the art understand all the embodiments disclosed herein. The scope of the present disclosure is limited by the appended claims.

What is claimed is:

1. A data transmission method, comprising:
   receiving a broadcast signal from a head-mounted display device, the broadcast signal comprising at least time synchronization information and/or control data and the broadcast signal being transmitted in accordance with a predetermined period;
   transmitting, in a wireless transmission channel that is obtained in advance, handle data to the head-mounted display device in accordance with a predetermined time interval;
   calculating current transmitting time of the handle data based on previous transmitting time of the handle data, a data updating frequency, and the wireless transmission channel in response to not receiving the broadcast signal; and
   transmitting the handle data to the head-mounted display device at the current transmitting time of the handle data.

2. The method of claim 1, further comprising, prior to receiving the broadcast signal:
   transmitting a pairing request to the head-mounted display device at a predetermined frequency point, the pairing request comprising at least a first device address and a device identity;
   receiving a pairing response from the head-mounted display device, the pairing response comprising at least a second device address and the wireless transmission channel; and
   binding the first device address and the second device address, and transmitting a pairing success message to the head-mounted display device.

3. The method of claim 1, wherein the broadcast signal further comprises a wireless transmission channel list, the wireless transmission channel, list being reselected and transmitted by the head-mounted display device after detecting interference information in an environment.

4. A handle, comprising a processor and a memory that stores an executable program or instructions that when executed by the processor, implements the steps of the data transmission method of claim 1.

5. The handle according to claim 4, Wherein the method further comprises, prior to receiving the broadcast signal:
   transmitting a pairing request to the head-mounted display device at a predetermined frequency point, the pairing request comprising at least a first device address and a device identity;
   receiving a pairing response from the head-mounted display device, the pairing response comprising at least a second device address and the wireless transmission channel; and
   binding the first device address and the second device address, and transmitting a pairing success message to the head-mounted display device.

6. The handle according to claim 4, wherein the broadcast signal further comprises a wireless transmission channel list, the wireless transmission channel list being reselected and transmitted by the head-mouthed display device after detecting interference information in an environment.

7. A data transmission system, comprising:
   a head-mounted display device comprising a first wireless communication module, a processor, and a memory that stores an executable program or instructions that, when executed by the processor, implements a data transmission method, and the data transmission method comprises:
      transmitting a broadcast signal in a predetermined period, the broadcast signal comprising at least time synchronization information and/or control data; and
      receiving handle data from a handle; and
   the handle comprising a second wireless communication module, an amplifier, a processor, and a memory that stores an executable program or instructions that, when executed by the processor, implements a data transmission method, and the data transmission method comprises:
      receiving a broadcast signal from the head-mounted display device, the broadcast signal comprising at least time synchronization information and/or control data and the broadcast signal being transmitted in accordance with a predetermined period;
      transmitting, in a wireless transmission channel that is obtained in advance, handle data to the head-mounted display device in accordance with a predetermined time interval;
      calculating current transmitting time of the handle data based on previous transmitting time of the handle data, a data updating frequency, and the wireless transmission channel in response to not receiving the broadcast signal; and
      transmitting the handle data to the head-mounted display device at the current transmitting time of the handle data;
   wherein the head-mounted display device and the handle are connected for wireless communication via the first wireless communication module and the second wireless communication module, and the amplifier is configured to amplify a strength of a wireless communication signal of the handle.

\* \* \* \* \*